(12) United States Patent
Vaughan et al.

(10) Patent No.: US 8,001,148 B2
(45) Date of Patent: Aug. 16, 2011

(54) CACHING PERMISSIONS INFORMATION

(75) Inventors: Greg B. Vaughan, Santa Cruz, CA (US);
David M. O'Rourke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 693 days.

(21) Appl. No.: 11/894,993

(22) Filed: Aug. 21, 2007

(65) Prior Publication Data

US 2007/0294236 A1    Dec. 20, 2007

Related U.S. Application Data

(62) Division of application No. 10/877,048, filed on Jun. 25, 2004, now Pat. No. 7,340,463.

(51) Int. Cl.
*G06F 7/00* (2006.01)
*G06F 17/30* (2006.01)

(52) U.S. Cl. ........................... 707/785; 709/223
(58) Field of Classification Search .................. 707/781, 707/782, 783, 785, 786; 709/223, 201
See application file for complete search history.

(56) References Cited

U.S. PATENT DOCUMENTS

| | | | |
|---|---|---|---|
| 5,173,939 A | 12/1992 | Abadi et al. | |
| 5,220,604 A | 6/1993 | Gasser et al. | |
| 5,283,830 A | 2/1994 | Hinsley et al. | |
| 5,315,657 A | 5/1994 | Abadi et al. | |
| 5,748,896 A | 5/1998 | Daly et al. | |
| 5,752,196 A | 5/1998 | Ahvenainen et al. | |
| 5,832,484 A * | 11/1998 | Sankaran et al. | 1/1 |
| 5,852,822 A | 12/1998 | Srinivasan et al. | |
| 5,897,637 A | 4/1999 | Guha | |
| 6,047,228 A | 4/2000 | Stone et al. | |
| 6,212,525 B1 | 4/2001 | Guha | |
| 6,263,434 B1 | 7/2001 | Hanna et al. | |
| 6,366,913 B1 | 4/2002 | Fitler, Jr. et al. | |
| 6,529,882 B1 | 3/2003 | Park et al. | |
| 6,601,062 B1 * | 7/2003 | Deshpande et al. | 1/1 |
| 6,671,695 B2 | 12/2003 | McFadden | |
| 6,697,835 B1 | 2/2004 | Hanson et al. | |
| 6,862,602 B2 | 3/2005 | Guha | |
| 6,883,100 B1 | 4/2005 | Elley et al. | |
| 6,947,924 B2 | 9/2005 | Bates et al. | |
| 6,965,767 B2 | 11/2005 | Maggenti et al. | |
| 6,975,873 B1 | 12/2005 | Banks et al. | |
| 7,024,515 B1 | 4/2006 | Ruan et al. | |
| 7,032,243 B2 | 4/2006 | Leerssen et al. | |
| 7,072,958 B2 * | 7/2006 | Parmar et al. | 709/223 |
| 7,080,195 B2 | 7/2006 | Ngai et al. | |
| 7,085,365 B2 | 8/2006 | Kauppinen | |

(Continued)

*Primary Examiner* — Hung T Vy
(74) *Attorney, Agent, or Firm* — Gazdzinski & Associates, PC

(57) ABSTRACT

A method for determining group membership in a computer system, the method comprising: obtaining an identifier that describes a member of a group, the member of a group having a member hash table that contains group membership information describing to what groups a member belongs; performing a primary search of a plurality of groups to determine if each group contains the member's identifier, each group in the plurality having a group hash table that describes to what other groups the group belongs, caching the results of the primary search in the member hash table, for each group to which the member belongs, performing a secondary search of a plurality of groups to determine what groups contain the group to which the member belongs, and caching the results of the secondary search into the group hash table and merging the results into the member hash table, and reading the member hash table to determine group membership.

36 Claims, 2 Drawing Sheets

U.S. PATENT DOCUMENTS

| | | |
|---|---|---|
| 7,085,834 B2 * | 8/2006 | Delany et al. .................. 709/225 |
| 7,130,839 B2 | 10/2006 | Bireham et al. |
| 7,171,427 B2 * | 1/2007 | Witkowski et al. ................... 1/1 |
| 7,177,978 B2 | 2/2007 | KanKar et al. |
| 7,213,262 B1 | 5/2007 | Elley et al. |
| 7,233,974 B2 | 6/2007 | Kawahara et al. |
| 7,240,149 B1 | 7/2007 | Naraj et al. |
| 7,240,171 B2 | 7/2007 | Barton et al. |
| 7,249,374 B1 | 7/2007 | Lear et al. |
| 7,260,720 B2 | 8/2007 | Yamamoto et al. |
| 2002/0059191 A1 | 5/2002 | Tamura |
| 2002/0087652 A1 * | 7/2002 | Davis et al. .................. 709/213 |
| 2002/0144149 A1 | 10/2002 | Hanna et al. |
| 2003/0041141 A1 | 2/2003 | Abdelaziz et al. |
| 2003/0196094 A1 | 10/2003 | Hillis et al. |
| 2004/0034616 A1 * | 2/2004 | Witkowski et al. ................ 707/1 |
| 2004/0054899 A1 | 3/2004 | Balfanz et al. |
| 2004/0083222 A1 * | 4/2004 | Pecherer ....................... 707/100 |
| 2004/0220956 A1 * | 11/2004 | Dillon ........................... 707/101 |
| 2005/0097166 A1 | 5/2005 | Patrick et al. |
| 2005/0220129 A1 | 10/2005 | Boyd |

* cited by examiner

CACHING PERMISSIONS INFORMATION

PRIORITY

This application is a divisional of co-owned and U.S. patent application Ser. No. 10/877,048 of the same title filed Jun. 25, 2004 now U.S. Pat. No. 7,340,463, incorporated herein by reference in its entirety.

FIELD

The present invention relates broadly to access control lists in computer operating systems. Specifically, the present invention relates to caching membership information and retrieving the membership information to avoid maintaining a database of backpointers.

BACKGROUND

Controlling user access is a fundamental aspect of network operating system functionality. With the proliferation of computer networks serving large numbers of users, access control lists are a fundamental part of managing network traffic as well as security. Users and other entities can be members of a group. Members and groups are represented in computer systems as objects. Members are organized into groups, with each group having certain privileges and access capabilities. Groups can contain subgroups, which introduces increased complexity to the network operating system's access control list implementation.

In current systems where group membership is determined at login time, the system suffers from the serious defect of only finding a limited number of groups to which the member belongs. Simply enumerating all the groups to see which ones the user is a member of is a concept that clearly doesn't scale well, and if nested groups are allowed, enumerating all groups to which a member belongs becomes impossible. Some directory services provide group membership determination at login, but only through database maintenance of back pointers. Such a database must be constantly updated as groups are created, and members join or are removed from groups. This is computationally expensive and requires significant bandwidth across large systems. Lightweight directory access protocol (LDAP) servers are becoming more and more popular among system administrators, but are overwhelmed by the demands and costs of maintaining such a database. Thus, there is a heartfelt need for a mechanism that meets the requirement of computational economy while still managing large and complex access control lists.

SUMMARY

In one aspect of the present invention, methods and apparatus for access control are disclosed. In one embodiment, a method for access control comprising: searching a plurality of groups to determine which groups of the plurality comprise an identifier; recording in a data structure a first set of groups comprising the identifier; and recursively recording group membership in the data structure is disclosed. In one variant, recursively recording group membership comprises searching the plurality of groups to determine which groups of the plurality reference the one group; and recording in the data structure additional sets of pointers to reference said determined groups is disclosed. In yet another variant, the method additionally comprises merging the first set of pointers and the additional sets of pointers to the identifier.

In another embodiment, methods and apparatus for access control are disclosed. In one such embodiment, the method comprises determining within a plurality of groups which of said groups of the plurality comprise an identifier; recording in a data structure a listing or representation of a first set of groups comprising the identifier; and for each group in the first set of groups: recursively determining a set of parent groups of said group; recording in the data structure a listing or representation of said set of parent groups; wherein the data structure determines access control associated with the identifier.

DETAILED DESCRIPTION

The present invention introduces the concept of access control lists (ACLs) in both the file system and directory. These ACLs are used on the filesystem, for directory access and for service access. In each case, an ACL consists of a number of access control entries, each of which identify a set of rights and to whom that set of rights is granted or possibly denied.

The present invention utilizes a "who" function that determines if the asking entity somehow matches an entry on an ACL. The "who" function can identify users and groups of users, as well as computers. In an embodiment, each of these entities (user, group or computer) is identified by a 128-bit number. However, previously-implemented UNIX groups are not sufficient to specify whether a given user is a member of a group. The most significant problem is that the UNIX group mechanism only identifies users by name, and there is a need for a more exact way of specifying users.

The present invention provides a daemon referred to herein as the resolver. If the client is unable to get a complete list of groups out of the user records, the resolver can employ the "who" function is to answer the question, "is user x a member of group y" and cache the result. This requires resources that run in the kernel (such as file systems) to make a call to a user-level process. The resolver can make system calls to inspect the group and see if the user is a member. For nested groups, the resolver may need to make repeated calls to fetch subgroups. The resolver caches group results as well as user membership data.

Thus, the resolver is used to construct an inverse mapping of directory services group membership information, and convert information relating to membership from the form Y contains X, Z contains Y, etc. to the form X is a member of Y, Y is a member of Z, etc. This is done on an as-needed basis, and avoids the computational complexity of maintaining a centralized database of backpointers. In an embodiment, rather than expanding groups, an indexed search of the server can be performed to find groups that contain the user directly. A recursive search is performed for groups containing those groups to build up a membership list for the specific user.

Figure 1:
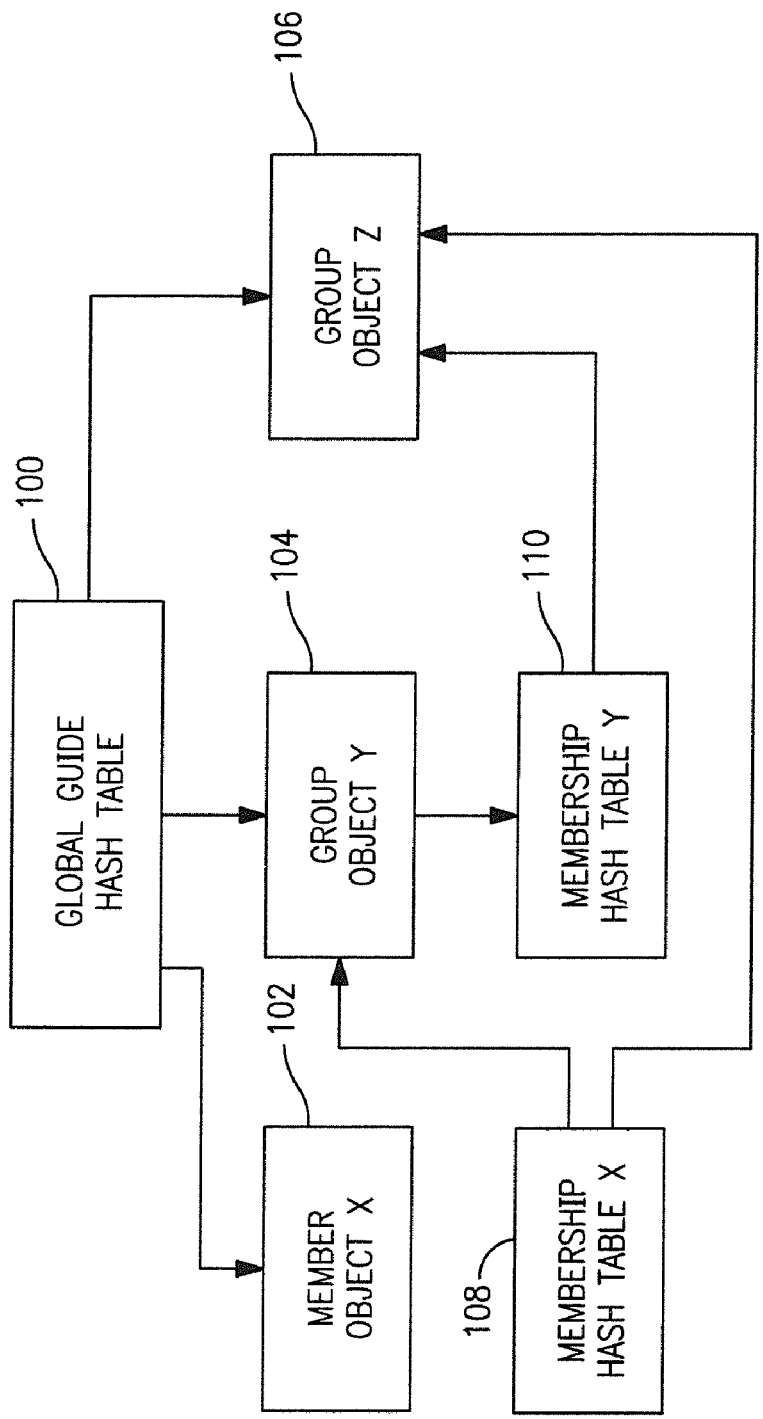
FIG. 1 illustrates the relationship of members and groups and their respective hash tables in accordance with the present invention.

Directing attention to FIG. 1, hash table 100 is a table of globally unique identifiers for a given system, with points to both members and groups. As illustrated, hash table 100 maintains pointers to member object X 102, group object Y 104, and group object Z 106. Member object X 102 maintains membership hash table 108, which maintains pointers to group Y object 104 and group Z object 106, signifying that membership object 102 is a member of both group Y and group Z. Group object Y 104 maintains group hash table 110, which contains a pointer to group Z 108, which indicates that group Y is a member group of group Z.

Figure 2:
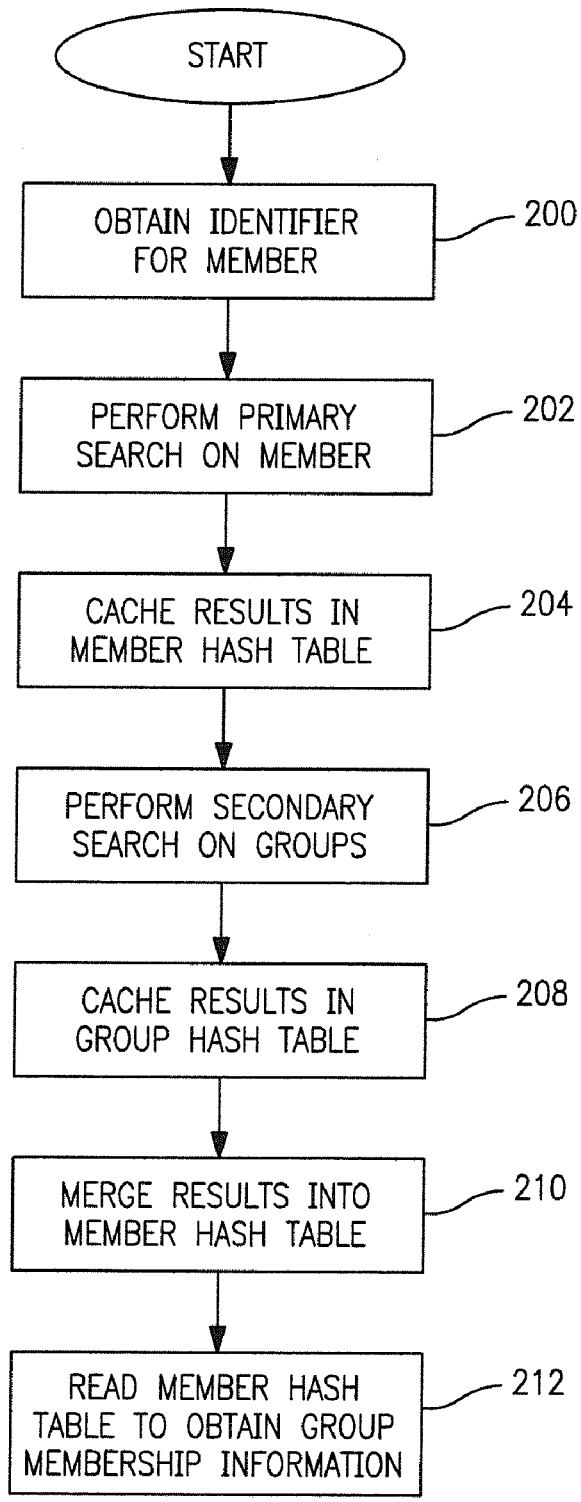
FIG. 2 illustrates in flow diagram form the sequence of acts performed in accordance with the present invention.

The sequence of acts performed in accordance with the present invention is illustrated in FIG. 2. For example, assume member object X 102 is a member of group object Y 104, which in turn is a member (a subset) of group object Z 106. To determine whether member object X 102 is a member of group Z, a search is performed on member object X 102 to retrieve the global ID that describes member object X 102 (act 200). A search is performed to find all groups that contain member object X 102's global ID, which returns group Y (act 202). This search result is cached (act 204). Another search is performed to find all groups that contain group object Y 104's group ID (act 206), which returns group Z. This information is cached for group object Y 104 (act 208) and this membership information is merged into member object X 102's hash table 108 (act 210). Group membership can be determined by looking directly at hash table 108 (act 212). In an embodiment, the time to live (expiration period) of member X hash table 108 is set to the smallest value of the caches that have been merged into member X hash table 108. In this case the time to live expires whenever hash table 110 expires.

To preserve computational economy on the server, a membership updater daemon can be employed by the server to keep the user's indirect membership information current. The membership updater contains a local cache of all groups on a node, as well as membership objects for all users or groups referenced directly or indirectly by groups on the node. Each member or group object in the hash tables 108, 110 maintain only immediate back pointers in the form of lists of groups which contain this user or group.

When group information changes, the membership updater only needs to update the immediate back pointers. However, when subgroups are added or removed, it needs to expand those groups so it can build a complete list of users whose membership attributes need to be updated. In an embodiment, if a search returns a group multiple times during an expansion, the group can be skipped since all its members are already on the list. Then the membership updater processes all the users that need to be updated, and expands their immediate memberships in the reverse direction to contain all the groups they're indirectly a member of.

In embodiments where changes in groups on a remote server can change membership in a local group that contains that remote group, the membership updater runs periodically even if it's also triggered by local change notifications.

While techniques for caching permissions information has been described and illustrated in detail, it is to be understood that many changes and modifications can be made to embodiments of the present invention without departing from the spirit thereof.

What is claimed is:

1. A computerized method comprising:
searching a plurality of groups to determine which groups of the plurality comprise an identifier;
recording in a data structure a first set of pointers to reference a first set of groups comprising the identifier; and
recursively recording group membership in the data structure comprising for each one group in the first set of groups:
searching the plurality of groups to determine which groups of the plurality reference the one group; and
recording in the data structure additional sets of pointers to reference said determined groups; and
merging the first set of pointers and the additional sets of pointers to the identifier.

2. The method of claim 1, wherein the data structure is adapted to be stored in cache memory.

3. The method of claim 1, wherein the data structure comprises a hash table.

4. The method of claim 3, wherein said method is adapted for use in a computer system, said identifier uniquely corresponding to a user of the computer system.

5. The method of claim 4, wherein the computer system comprises an access control list, said access control list comprising a set of access rights for each group in said plurality of groups.

6. The method of claim 5, wherein each set of access rights comprises rules for directory access and for service access.

7. The method of claim 5 further comprising:
retrieving a second set of groups from the hash table; and
for each group in the second set of groups, retrieving the set of access rights corresponding to that group from the access control list.

8. The method of claim 7, wherein the second set of groups comprises immediate parents of the identifier.

9. The method of claim 7, wherein the second set of groups comprises all parents of the identifier.

10. The method of claim 4, wherein the identifier is stored as a hash value in a second hash table.

11. A computerized apparatus comprising a medium adapted to store a computer program, said computer program which, when executed:
searches a plurality of groups and determine which groups of the plurality comprise an identifier;
records in a data structure a first set of pointers to reference a first set of groups comprising the identifier;
recursively determines a set of parent groups for each group in the first set of groups;
recursively records in a data structure additional sets of pointers to reference each set of parent groups in the data structure; and
merges the first set of pointers and the additional sets of pointers to the identifier.

12. The apparatus of claim 11, wherein the data structure is adapted to be stored in cache memory.

13. The apparatus of claim 11, wherein the data structure comprises a hash table.

14. The apparatus of claim 13, wherein the identifier uniquely corresponds to a user of a computer system.

15. The apparatus of claim 14, wherein the computer system comprises an access control list, said access control list comprising access rights for each group in said plurality of groups.

16. The apparatus of claim 15, wherein the access rights comprise rules for directory access and for service access.

17. The apparatus of claim 15 further comprising:
logic adapted to retrieve a second set of groups from the hash table; and
logic adapted to retrieve from the access control list the access rights corresponding to each group in said second set of groups.

18. The method of claim 17, wherein the second set of groups comprises immediate parents of the identifier.

19. The method of claim 17, wherein the second set of groups comprises all parents of the identifier.

20. A computerized system, the system comprising a computer readable medium adapted to store a computer program, said computer program which, when executed:

searches a plurality of groups to determine which groups of the plurality comprise an identifier, said identifier uniquely corresponding to the user;

records in a data structure a first set of groups comprising the identifier;

recursively determines a set of parent groups for each group in the first set of groups;

records each set of parent groups in the data structure;

retrieves a second set of groups from the hash table; and determines the user's access rights based at least in part on said second set of groups.

21. For use in a computer system, a method for managing access control data, comprising:

determining within a plurality of groups which of said groups of the plurality comprise an identifier;

recording in a data structure a listing or representation of a first set of groups comprising the identifier; and for each group in the first set of groups:

recursively determining a set of parent groups of said group;

recording in the data structure a listing or representation of said set of parent groups; and wherein the data structure determines access control associated with the identifier.

22. The method of claim 21, wherein the recording in a data structure comprises storing in cache memory.

23. The method of claim 21, wherein the recording in a data structure comprises recording in a correlation table.

24. The method of claim 23, wherein said identifier uniquely corresponds to a user of the computer system.

25. The method of claim 24, wherein the computer system comprises an access control list, said access control list comprising a set of access rights for each group in said plurality of groups.

26. The method of claim 24, wherein each set of access rights comprises rules for directory access and for service access.

27. The method of claim 25 further comprising:

retrieving a second set of groups from the correlation table; and for each group in the second set of groups, retrieving the set of access rights corresponding to that group from the access control list.

28. The method of claim 27, wherein the second set of groups comprises parents that are only immediate parents of the identifier.

29. The method of claim 27, wherein the second set of groups comprises all parents of the identifier.

30. The method of claim 24, wherein the identifier is stored as a hash value in a second correlation table.

31. A method of operating a computerized system, the method being used at least in part to control access and comprising:

searching a plurality of groups to determine at least one group of the plurality comprising an identifier;

recording in a data structure said at least one group comprising the identifier;

determining at least one parent group of said at least one group;

recording in the data structure said at least one parent group;

thereafter accessing the data structure; and utilizing at least one of: (i) said at least one group comprising the identifier, and (ii) said at least one parent group, to control access to at least a portion of said computerized system.

32. The method of claim 31, wherein the data structure is adapted to be stored in cache memory.

33. The method of claim 31, wherein the data structure comprises a hash table.

34. The method of claim 31, wherein said identifier uniquely corresponds to a particular user of the computerized system.

35. The method of claim 34, wherein the computer system comprises an access control list, said access control list comprising a set of access rights for each group in said plurality of groups.

36. The method of claim 35, wherein each set of access rights comprises rules for directory access and for service access.

* * * * *